United States Patent Office 3,218,863
Patented Nov. 23, 1965

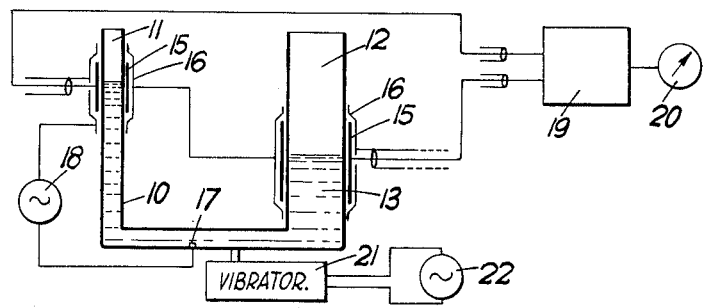
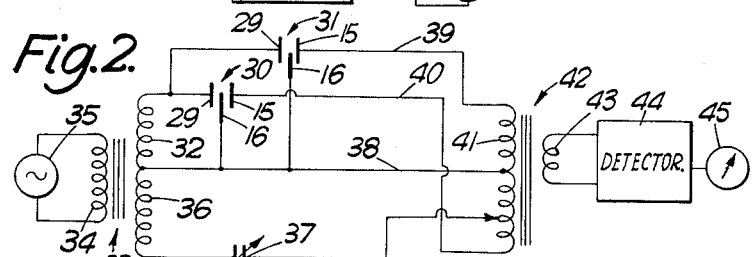
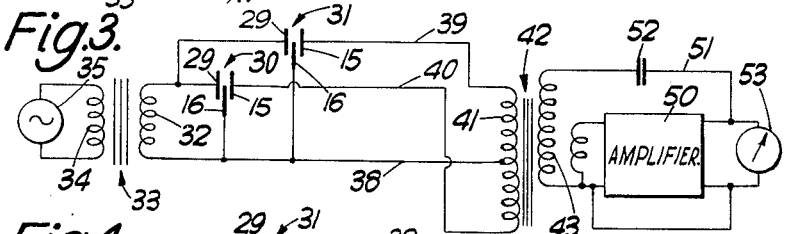
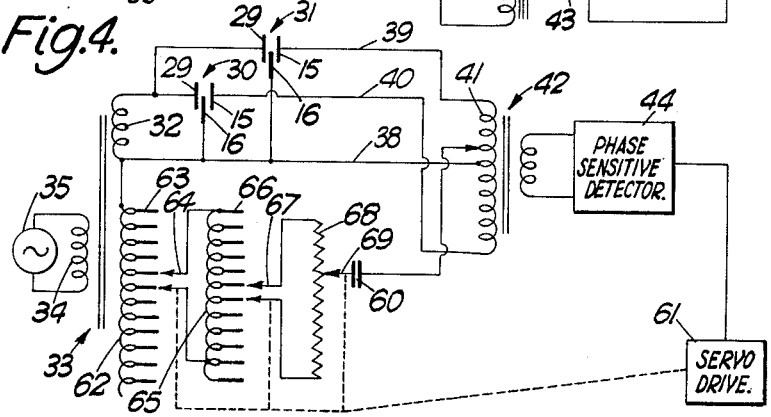

3,218,863
PRESSURE RESPONSIVE APPARATUS
Raymond Calvert, Chessington, England, assignor to The Wayne Kerr Laboratories Limited, Chessington, England, a British company
Filed May 6, 1963, Ser. No. 278,273
Claims priority, application Great Britain, May 7, 1962, 17,470/62
8 Claims. (Cl. 73—398)

This invention relates to pressure responsive apparatus for example pressure measuring apparatus and according to this invention such apparatus comprises a U-tube of electrically non-conductive material containing a conductive liquid, means for applying the pressure to which the apparatus is to respond to one limb of the U so that the relative liquid levels in the two limbs depends on the applied pressure, transducing means on each limb for producing an electrical signal dependent on the level of the liquid in the limb and combining means for combining said electrical signals to produce a combined output dependent on the relative liquid levels, each of said transducing means making use of the liquid as a first electrode and having a second electrode formed of conductive material outside said tube, a conductive screen over said second electrode which screen extends axially in both directions beyond said second electrode and means for applying an alternating voltage between one of the electrodes and said screen whereby the resultant current between the other electrode and the screen depends on the liquid level with respect to the second electrode. With the arrangement described, in each transducer the means responsive to the current between said other electrode and screen gives a measure of the capacitance between the first and second electrodes. When the liquid partly or wholly occupies the tube adjacent the second electrode there is a capacitance between the liquid and this electrode. If however, the liquid should not have reached that part of the tube, the screen ensures that there is no effective capacitance between the liquid and the second electrode. The capacitance between the first and second electrodes therefore will depend on the level of the liquid in the tube and hence on the applied pressure. The current in the responsive means is dependent on the capacity between the liquid and the second electrode and hence on the applied pressure. With this construction it is possible to make the apparatus sensitive to very small changes in position of the liquid in the tube and this arrangement thus permits of accurate pressure measurement provided the density of the liquid is known.

Preferably each of said transducing means is arranged to provide a signal linearly proportional to the displacement of the liquid level in the limb from a datum position. The two signals can thus be combined algebraically and, if the two limbs of the U are of different sizes, e.g. of different cross-sectional areas, the proportions in which the signals combined can be in accordance with the relationship between change of capacity and change of level so that the output is linearly proportional to the pressure.

The arrangement thus provides an electrical signal output which can be accurately related to the pressure to be measured without requiring calibration of a pressure transducer such as has heretofore been employed when it is required to obtain an electrical signal dependent on an applied pressure. The electrical signal may be applied to indicating means if it is required to indicate the pressure or may be used for other purposes, for example, for control purposes; in the latter case, for example, the output current from the current responsive means may be applied to a suitable servo system for controlling the pressure e.g. to maintain the pressure at a constant value.

In one or in each transducer the second electrode and the conductive screen may be movably positioned on the tube so as to enable the pressure measurement to be made over a selected range of pressures at any point within the overall range permitted by the length of the tube.

The second electrode may extend part of the way or completely around the tube. The screen would be arranged to extend over the whole of this electrode and to extend axially beyond the electrode so as to form an electrostatic shield.

The screen may be earthed but often it is more convenient to have the liquid in the tube electrically connected to earth, either by direct contact of the liquid with an earthed electrode passing into the tube or effectively by capacitive coupling through the wall of the tube to a suitable earthed electrode. The electrical connections to the second electrode and screen may conveniently be made using a co-axial cable with the outer conductor of the cable connected to the screen. The cable capacitance will not affect the measurement of the inter-electrode capacitance if this inter-electrode capacitance is determined, as previously described, by applying an alternating voltage between one electrode, conveniently the liquid, and the screen and measuring the output current between the other electrode and the screen.

The aforementioned combining means may comprise a current responsive device to which is fed a difference signal derived from the currents between said other electrode and said screen in each transducer and a balancing circuit arranged to feed a balancing current to said current responsive device in opposition to the differene signal so that the current responsive device presents no impedance to said difference signal. The current responsive device may comprise a transformer having an input winding or windings to which are fed the currents between said other electrode and said screen from each transducer and an amplifier for amplifying the resultant signal from an output winding on the transformer and the balancing circuit in this case may provide the input current to said transformer derived from or controlled by the output of the amplifier.

With apparatus using a liquid in a tube, the level of the liquid changes in discrete steps due to the liquid sticking to the container and thus puts a limit to the accuracy of such apparatus for measuring pressures by reference to a visually observed graduated scale. With the arrangement of the present invention, it is not essential to be able to read the position of the liquid in the tube visually in order to make a measurement and means may be provided for vibrating the tube. This prevents the liquid sticking in the tube and enables a more accurate reading to be obtained. The vibrating means may conveniently be electrically operated, e.g. a moving coil vibrator energised with an alternating current supply at any convenient frequency, conveniently a 50 or 60 cycles per second supply may be employed.

The following is a description of a number of embodiments of the invention, reference being made to the accompanying drawings in which:

FIGURE 1 is a diagram illustrating a pressure measuring apparatus with its associated electrical measuring equipment; and FIGURES 2, 3 and 4 are circuit diagrams illustrating various different circuit arrangements which may be used for the electrical measuring apparatus of FIGURE 1.

Referring to FIGURE 1 there is shown a U-tube 10 having two limbs 11, 12 and with a conducting liquid 13 such as mercury in the U-tube. The pressure to be meaured is applied to one of the limbs 12, and, assuming this is a positive pressure, the liquid level in this limb is forced downwards and the level of the liquid in the other limb 11 moves upwards so that the difference in levels represents the difference of the pressures applied to the limbs 11, 12. The U-tubes for measuring pressures in this way are well known and the present invention is concerned more particularly wtih the measurement of the difference of the levels of the liquid in the two limbs 11, 12. In this measuring arrangement of the present application, it is possible to have the two limbs of different cross-sectional area and such an arrangement is illustrated in FIGURE 1 although in many cases it may be more convenient to have both limbs of the same cross-sectional area. Each of the limbs however must be of uniform cross-sectional area if there is to be a linear relationship between the output indication and the applied pressure difference.

In the arrangement in the present invention, the levels in the liquids in the two limbs are determined electrically by measuring the capacitance between the liquid in the tube and an electrode outside the tube. Three-terminal measuring means are used so that this capacitance can be determined whilst "seeing off" any capacitance between the liquid or the external electrode to any other body. It will be appreciated that the capacitance between the liquid and the external electrode around the tube will depend inter alia, on the circumference of the tube and the thickness of the tube wall and such factors have to be taken into account in determining the relationship between an output signal and change in level of the liquid. On each limb the pressure transducer comprises an electrode 15 which preferably surrounds the tube although, if desired, it may extend only partially around the tube and a screen 16 which extends around the electrode 15 and tube and extends axially in both directions beyond the electrode 15. The screen is formed of conductive material and, if it is required to observe the liquid level visually, the screen may be formed of conductive glass and the electrode may have a slit extending in the axial direction of the tube to permit of visual observation of the liquid level. The transducers comprising the electrode 15 and the screen 16 may be made movable axially along one or each limb if desired. It will be seen that when the liquid partly or wholly occupies the tube within an electrode 15, there is capacitance between the liquid and this electrode. If the liquid should not have reached that part of the tube, the screen 16 ensures that there is no effective capacitance between the liquid and the electrode 15. The capacitance between the liquid and the electrode 15 will therefore depend upon the level of the liquid in the tube. To measure this capacitance an alternating voltage is applied between the liquid and the screen. For this purpose there is provided an electrode 17 in the liquid with the alternating voltage, from a source indicated diagrammatically at 18, being applied between this electrode 17 and the screen 16 of each transducer, the screens of the two transducers being connected together. Instead of having an electrode 17 in the liquid, a capacitive connection to the liquid may be effected using a capacitive electrode outside the tube, e.g. a sleeve around the tube. In many cases, the liquid in the tube may be earthed and an alternating voltage with respect to earth applied to the two screens. The voltage applied to the liquid with respect to the screen will, if there is any capacitance between the liquid and the external electrode 15, cause a current to flow between the electrode 15 and the screen and the magnitude of this current is a measure of the capacitance between the liquid and the electrode 15. With a uniform section tube, the capacitance is proportional to the level of the liquid in the tube, although, as explained above, the proportionality factor will depend, inter alia, on the size of the tube. The signals from the two transducers, that is to say the currents between each of the electrodes 15 and the associated screen, are combined between in the appropriate proportions in combining means indicated diagrammatically at 19 to give an output on an indicator 20 representative of the difference of the levels of the liquid in the two limbs 11, 12.

In pressure measuring apparatus using a liquid in a tube, the level of the liquid will tend to change in discrete steps due to the liquid sticking to the walls of the tube. This puts a limit to the accuracy of such apparatus when it is used for measuring pressures by visual observation with reference to a graduated scale. With the arrangement of the present invention, however, where the difference of levels of liquid is determined electrically, it is not essential to be able to see the position of the liquid and the tube can be vibrated to prevent such sticking. Vibrating means for vibrating the tube are indicated diagrammatically at 21 and might typically comprise a moving coil vibrator which is energised with an alternating current supply at a frequency of 50 to 60 cycles per second from an alternating current mains supply source 22.

FIGURE 2 illustrates a simple form of circuit for the two transducers and their associated indicating equipment. In FIGURE 2 the two transducers are indicated at 30 and 31 respectively by capacitors one plate 29 of which is constituted by the liquid and the other plate by the external electrode 15. The plates marked 29 of the two capacitors 30, 31 in FIGURE 2 are electrically connected together since the liquid is conductive and are connected (via the electrode 17 of FIGURE 1) to one end of a winding 32 on an input transformer 33 which has a primary winding 34 energised from an alternating current supply source 35. The winding 32 is one of two closely coupled series-connected secondary windings 32, 36. The second winding 36 is connected to one plate of a standard capacitor 37. The junction of the two windings 32, 36 is connected by a lead 38, referred to hereinafter as the neutral line, to the screens 16 of the two transducers. The electrodes 15 of the two transducers are connected by leads 39, 40 to two separate taps on a winding 41 of an output transformer 42. The neutral line 38 is connected to the winding 41 at a point between the taps to which the leads 39, 40 are connected. The output transformer 42 has a secondary winding 43 which is connected to a detector 44 and a null balance indicator 45. It will be seen that the alternating voltage from the winding 32 is applied to the two transducers and the resultant currents from the electrodes 15 produce opposing flux in the winding 41. If the capacitances between the liquid and the electrode 15 of each of the two transducers were the same, then there would be equal currents through the two leads 39, 40 and these would balance in the winding 41 so giving a null indication on the indicator 45. Any difference however in the capacitances in the two transducers would upset this balance. The circuit can be re-balanced by means of the adjustable standard capacitor 37 which feeds a balancing current itno the winding 41. The magnitude of the balancing current from the standard capacitor 37 required to effect balance is thus a measure of the difference of the capacitances in the two transducers. The standard capacitor 37 is an adjustable capacitor but alternatively or additionally the voltage applied to it may be altered by connecting the capacitor to an adjustable tap on the winding 36. The circuit of FIGURE 2 thus constitutes a transformer ratio-arm bridge for determining the difference of two capacities. By using the screen 16 connected to the neutral line 38, any capacitance between the liquid and the screens 16 is fed from the winding 32 and does not affect the balance. In the balance condition, there is no voltage across the winding 41 and hence there is no current flowing between the electrode 15 and the screen 16 in either transducer. Thus this measuring circuit enables the difference in the capacitances in the two transducers to be determined whilst "seeing off" any capacitance to the screen 16. As shown in FIGURE 1, the connections to the electrodes 15 may be effected using co-axial cables with the outer conductors of the cable connected to the screens. The cable capacitance will not affect the measurement of the capacitance between the electrodes 15 and the liquid since this cable capacitance is "seen off" in the same way as the capacitance to the screens 16. It will be immediately apparent that if the two limbs of the U-tube are of different size, the necessary compensation in combining the signals may be effected by appropriate positioning of the taps to which the leads 39, 40 are connected on the winding 41 so that the tapped portions of the windings have a turns ratio corresponding to the ratio in which the output currents from the two transducers are to be combined.

As is generally the case with transformer ratio-arm bridge circuits, the source 35 and the detector 44 (with the indicator 45) may be interchanged.

The arrangement of FIGURE 2 is a simple form of transformer ratio-arm bridge. For many purposes it may be preferred to use a direct reading bridge or a self-balancing bridge. FIGURE 3 illustrates a form of direct reading bridge circuit in which the pressure difference in the two limbs can be indicated directly on a meter. In FIGURE 3 the same reference characters are used as in FIGURE 2 to indicate corresponding components. Referring to FIGURE 3 alternating current from a source 35 is fed to a primary winding 34 of a transformer 33 having a secondary winding 32 which applies a voltage to the two transducers. These are indicated as in FIGURE 2 as capacitors 30, 31 and as before the voltage is applied to the liquid indicated by the plates 29. The neutral line 38 is connected to the screens 16 of the two transducers. The resultant currents from the electrodes 15 of the two transducers are fed through leads 39, 40, as in the arrangement of FIGURE 2, to taps on a winding 41 of an output transformer 42. The taps on the windings are adjusted in accordance with the size of the two limbs as in the arrangement of FIGURE 2. It will be seen that the output voltage on the secondary winding 43 of the transformer 42 will depend on the difference of level of the liquid in the limbs 11, 12. This voltage is applied to a high gain amplifier 50 having a negative feedback circuit 51 including a standard impedance, illustrated in FIGURE 3 as a capacitor 52. Since the amplifier 50 has a high gain, the feedback current will substantially balance the input current to give negligible input to the amplifier 50. The feedback current will therefore balance the input from the transformer 42. The feedback current is proportional to the output voltage from the amplifier 50 and this feedback current or the output voltage from the amplifier may be measured to give a measure of the input voltage to the winding 43. In the arrangement of FIGURE 3 the output indication is shown as a volt meter 53 connected across the output terminals of the amplifier 50, but it might equally well be a current indicator in the feedback path. It will be seen that the amplifier 50 provides adequate power for operating the indicator 53 without however affecting the accuracy of the indication since it does not absorb power from the winding 43. It will be appreciated that this output from the amplifier may also be used to operate other devices for example a recorder or servo control mechanism for controlling the pressure or some other parameter. Although the feedback circuit 51 is shown as a capacitive feedback circuit, it need not necessarily be capacitive and any standard impedance may be employed. It will be noted that the arrangement of FIGURE 3 provides, by means of the feedback circuit, a balancing current into the input of the amplifier 50 so that the net input is substantially zero. Thus, in a similar manner to the circuit of FIGURE 2, the arrangement of FIGURE 3 is not affected by the capacitance to the screen or the capacitance of co-axial cable connections from the electrodes 15 to the winding 41. The arrangement of FIGURE 3 thus provides a direct reading on a meter of the pressure difference in the two limbs 11, 12. This meter can be calibrated in any required units of pressure.

FIGURE 4 illustrates a self-balancing bridge arrangement enabling the pressure difference to be indicated in a series of decade steps thereby facilitating numerical readout. The arrangement of FIGURE 4 is a transformer ratio-arm bridge generally similar to that of FIGURE 2 and the same reference numerals are used to indicate corresponding components. In FIGURE 4 however instead of using an adjustable standard capacitor 37 there is employed a standard capacitor 60 which is fed with an adjustable voltage controlled by a servo mechanism 61 from the output of the detector 44. The bridge arrangement illustrated is similar to that described in co-pending British Application No. 22,973/62 and has a decade tapped winding 62 on the transformer 33. There are 12 taps 63 providing equal steps of voltage and two movable contacts 64 to enable the voltage between two adjacent taps 63 to be applied to a winding 65 having a further series of decade taps 66. The taps 66 provide equal steps of voltage of a magnitude one tenth of that provided by the taps 63 on the winding 62. The voltage between any adjacent pair of taps 66 is selected by movable contacts 67 and applied across a potentiometer 68. An adjustable tap 69 on this potentiometer is used to feed the capacitor 60. The taps on the winding 62 are adjusted to give the first stage of voltage adjustment this being effected in ten steps, the servo mechanism 61 adjusting the contacts 64 automatically in the direction to increase the voltage applied to the capacitor 60 until the balance point is passed. Thereupon the contacts 64 are kept on these taps on the winding 63, and the contacts 67 on the taps 66 of winding 65 are adjusted in the reverse direction (i.e. in the direction to decrease the applied voltage), the adjustment being made automatically to effect a second stage of voltage adjustment. Further decade windings may be provided if desired but, for simplicity in FIGURE 4 the voltage across contacts 67 is applied to the potentiometer 68. When contacts 67 have moved past the balance point, they are held fixed and the potentiometer 68 is adjusted, in this case, in the direction to increase the applied voltage. The positions of the contacts 64, 67 and tap 69 indicate the magnitude of the voltage applied to the capacitor 60 and hence the difference in the levels of the liquid in the two limbs of the U-tube. It will be appreciated that, by using further decade windings, the adjustment of voltage may be made to a very high degree of accuracy.

Numerical indicators (not shown) driven from the contacts 64, 67 and tap 69 provide a direct numerical indication in decimal form of the voltage applied to the capacitor 60 and hence of difference of levels of the liquid in the two limbs of the U-tube. It will be seen that the arrangement of FIGURE 4 is a self-balancing bridge providing direct numerical read-out indication. The output of the servo 61 may also be used for control purposes.

I claim:

1. Pressure responsive apparatus comprising a U-tube of electrically non-conductive material containing a conductive liquid, means for applying the pressure to which the apparatus is to respond to one limb of the U so that the relative liquid levels in the two limbs depend on the applied pressure, transducing means on each limb for producing an electrical signal dependent on the level of the liquid in the limb and combining means for combining said electrical signals to produce a combined output dependent on the relative liquid levels, each of said transducing means making use of the liquid as a first electrode and having a second electrode formed of conductive material outside said tube, a conductive screen over said second electrode which screen extends axially in both directions beyond said second electrode, a neutral line to which said screens are electrically connected, and means for applying an alternating voltage between one of the electrodes and said neutral line whereby the resultant current between the other electrode and the neutral line depends on the liquid level with respect to the second electrode.

2. Pressure responsive apparatus as claimed in claim 1 wherein each of said transducing means is arranged to provide a signal linearly proportional to displacement of the liquid level in the limb from a datum position.

3. Apparatus as claimed in claim 1 wherein said combining means comprises a current responsive device to which is fed a difference signal derived from the currents between said other electrode and said neutral line in each of the transducers, and a balancing circuit arranged to feed a balancing current to said current responsive device in opposition to the difference signal so that the current responsive device presents a low impedance to said difference signal.

4. Apparatus as claimed in claim 3 wherein said current responsive device comprises a transformer having an input winding or windings to which are fed the currents between said other electrode and said neutral line from each transducer and an amplifier for amplifying the resultant signal from an output winding on the transformer and wherein said balancing circuit provides an input current to said transformer derived from or controlled by the output of the amplifier.

5. Apparatus as claimed in claim 1 wherein the means for applying an alternating voltage between one of the electrodes and said screen comprises an input transformer having a winding feeding both transducers and wherein the means for combining the signals comprises an output transformer having two closely coupled windings to which the two resultant currents are fed, the windings being arranged to combine the signals in proportions so that the combined signal is directly proportional to changes in the applied pressure.

6. Pressure responsive apparatus comprising a U-tube of electrically non-conductive material containing a conductive liquid, means for applying the pressure to which the apparatus is to respond to one limb of the U so that the relative liquid levels in the two limbs depend on the applied pressure, transducing means adjustable in position on each limb, which transducing means make use of the liquid as a first electrode and have a second electrode formed of conductive material outside said tube and a conductive screen over said second electrode extending axially in both directions beyond said second electrode, a neutral line to which said screens are electrically connected, means for applying an alternating voltage between one of the electrodes and the neutral line on each transducing means to produce resultant currents between the other electrode and the neutral line linearly dependent on the liquid level in the respective limbs, combining means combining said resultant currents to produce a difference signal representative of the difference of the two currents, a current responsive device responsive to said difference signal and a balancing circuit arranged to feed a balancing current to said current responsive device in opposition to the difference signal so that the current responsive device presents a low impedance to said difference circuit.

7. Pressure responsive apparatus comprising a U-tube of electrically non-conductive material containing a conductive liquid, means for vibrating said tube, means for applying the pressure to which the apparatus is to respond to one limb of the U so that the relative liquid levels in the two limbs depend on the applied pressure, transducing means on each limb making use of the liquid as a first electrode and having a second electrode formed of conductive material outside said tube and a conductive screen over said second electrode extending axially in both directions beyond said second electrode, a neutral line to which said screens are electrically connected, means for applying an alternating voltage between one of the electrodes and the neutral line on each transducing means to produce resultant currents between the other electrode and the neutral line linearly dependent on the liquid level in the respective limbs, combining means combining said resultant currents to produce a difference signal representative of the difference of the two currents, a current responsive device responsive to said difference signal and a balancing circuit arranged to feed a balancing current to said current responsive device in opposition to the difference signal so that the current responsive device presents a low impedance to said difference circuit.

8. Pressure responsive apparatus comprising a U-tube of electrically non-conductive material containing a conductive liquid, means for applying the pressure to which the apparatus is to respond to one limb of the U so that the relative liquid levels in the two limbs depend on the applied pressure, transducing means on each limb making use of the liquid as a first electrode and having a second electrode formed of conductive material outside said tube and a conductive screen over said second electrode extending axially in both directions beyond said second electrode, a neutral line to which said screens are electrically connected, means for applying an alternating voltage between one of the electrodes and the neutral line on each transducing means to produce resultant currents between the other electrode and the neutral line linearly dependent on the liquid level in the respective limbs, combining means combining said resultant currents to produce a difference signal representative of the difference of the two currents, a current responsive device responsive to said difference signal, a balancing circuit arranged to feed a balancing current to said current responsive device in opposition to said difference signal, and indicator means associated with said balancing circuit to give a visual indication of the magnitude of said balancing current.

No references cited.

LOUIS R. PRINCE, *Primary Examiner.*